April 26, 1938.   C. KRAUCH ET AL   2,115,336
CONVERSION OF SOLID FUELS AND PRODUCTS DERIVED THEREFROM
OR OTHER MATERIALS INTO VALUABLE LIQUIDS
Filed Oct. 1, 1934
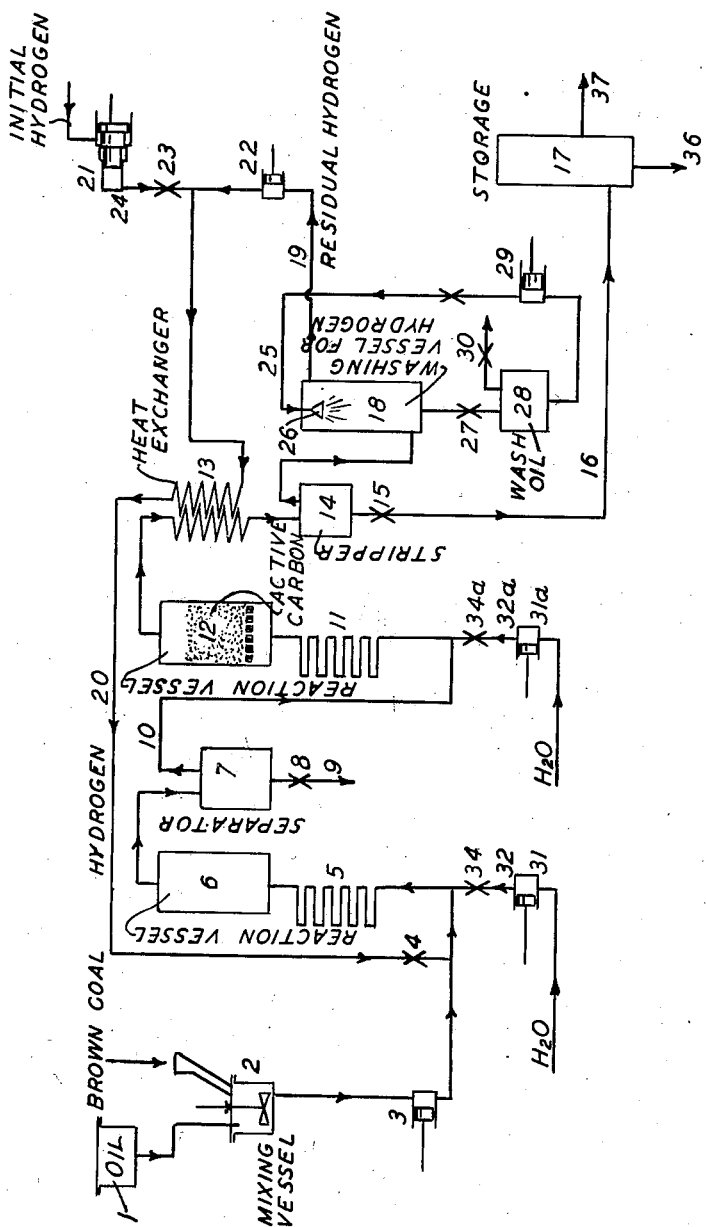
INVENTORS
CARL KRAUCH
MATHIAS PIER
BY Hauff & Warland
ATTORNEYS.

Patented Apr. 26, 1938

2,115,336

UNITED STATES PATENT OFFICE 2,115,336

CONVERSION OF SOLID FUELS AND PRODUCTS DERIVED THEREFROM OR OTHER MATERIALS INTO VALUABLE LIQUIDS

Carl Krauch and Mathias Pier, Heidelberg, Germany, assignors to Standard-I. G. Company, Linden, N. J., a corporation of Delaware Application October 1, 1934, Serial No. 746,386
In Germany February 14, 1925

2 Claims. (Cl. 196—53)

Our invention relates to the destructive hydrogenation of carbonaceous materials, in particular, to that process which is carried out in the presence of a catalyst immune to sulphur poisoning, as described and claimed in our copending application Ser. No. 625,654, of which this application is a continuation-in-part.

The object of our invention is to provide a catalyst which will act efficiently in the conversion of carbonaceous substances into valuable liquids by destructive hydrogenation.

In our application Ser. No. 625,654, now Patent No. 1,994,075, we have indicated that mixed catalysts containing oxides of metals, especially oxides of heavy metals and more particularly oxides of metals of the sixth group of the periodic system and free sulphur are very efficient in the promotion of the destructive hydrogenation of carbonaceous materials. We have also disclosed in that application the employment of metal oxides in conjunction with sulphur which is added to the reaction chamber in the form of organically combined sulphur contained in the initial carbonaceous material. These disclosures in Ser. No. 625,654 relate back to our application Ser. No. 86,646, now Patent No. 1,890,434, with which Ser. No. 625,654 was copending. The present invention also discloses and claims subject-matter disclosed but not specifically claimed in our applications 625,648 now Patent No. 2,005,192 and 625,651 now Patent No. 1,996,009.

Our present application is directed to the use of mixed catalysts containing metal oxides, particularly heavy metal oxides, and more especially oxides of metals of group six of the periodic system in conjunction with free sulphur or organically combined sulphur for the destructive hydrogenation of carbonaceous materials.

Among the most suitable of the specific mixtures of the type defined above for the destructive hydrogenation of carbonaceous materials may be mentioned free sulphur mixed with an oxide of zinc, vanadium, molybdenum, tungsten, uranium, manganese, chromium or cobalt. These oxides may be employed as such or as compounds of the corresponding metals which, under the conditions of working, will be decomposed to the oxides, such as carbonates or nitrates or metal acids, such as molybdic acid, tungstic acid, chromic acid, etc. Instead of adding free sulphur to oxides of the type specified, the sulphur can be contained, either naturally or by addition, in the initial carbonaceous material as organic compounds of sulphur. Other catalysts known to be suitable for the destructive hydrogenation of carbonaceous materials may be used in conjunction with these mixtures.

These mixed catalysts may be caused to act on solid or liquid carbonaceous material in any suitable manner. They may be added to the solids or liquids or, in the case of liquids, they may be placed in the reaction vessel and the liquids brought into contact with them in a vaporized or other finely divided state.

As regards the materials to be treated, the invention can be applied to any sort of solid fuels, for example, hard or soft coal, brown coal, lignite, peat, wood, or similar materials, mineral oils, shale oils, or other solid or liquid bitumina, also distillation or extraction products of all of them, such as tars obtained therefrom, whether by ordinary destructive distillation or by low temperature carbonization, or brown coal bitumen, or tars or oils obtained by pressure hydrogenation of solid or liquid fuels, or components or conversion products of all the above mentioned materials, such as cracked products, coumarone or any other resins or residues of their distillation, pitch, asphaltum and so on, or mixtures of several such products with each other, also of solids with the above-named liquids or of one or more of such products with other suitable organic liquids.

Especially when employing coal or liquid fuels, an addition of lignite or peat is often of advantage, often increasing the hydrogenizing action, avoiding several drawbacks and, in the case of solid substances, rendering their introduction easier. All the said materials may be used in the presence of substantial amounts of water and, if desired, water may be added as such. Sometimes the process of hydrogenation is hereby furthered. For example, lignite producer tar containing from 40 to 50 per cent of water may be used to advantage directly.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

We further discovered that the process according to the present invention is in many cases, and in particular when converting solid fuels or heavy oils or residues, greatly improved by being carried out in two parts or stages. In the first stage, the coal, tars or heavy petroleum products are converted into liquids poor in fractions of low boiling point by liquefaction or destructive hydrogenation with or without catalysts, while in the second stage the products of stage one are transformed into hydrocarbons of low boiling point, by destructive hydrogenation, but preferably with the aid of catalysts. Increased pressure is preferably employed in one or both stages. Insofar as catalytic masses are added in both stages, they may be of the same kind or different in quantity, concentration, or kind. The two stages can be effected in two separate or adjoining reaction vessels or in different parts of a single vessel constructed in a suitable manner. Even more than two stages may be employed successively in certain cases.

The gases serving for the reaction may consist of hydrogen alone or of mixtures containing hydrogen, for example a mixture of hydrogen with nitrogen, or water gas, or hydrogen mixed with carbon dioxide, hydrogen sulphide, water vapor or methane or other hydrocarbons. Or the hydrogen may be generated in the reaction chamber by the interaction of water and carbon monoxide, and the like. When employing nitrogen compounds as catalysts, and carbon monoxide and water, the gas must be employed in a stream.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example, temperature and pressure employed or duration of the treatment, the products are poor or rich in products of low boiling point. Generally, the temperature ranges between 300° and 700° C., and the pressure, when used, should amount to at least 20 atmospheres and should preferably be much higher up to about 2000 atmospheres.

The process according to the present invention is preferably carried out in vessels which are constructed of or lined with highly alloyed steels such as chromium or nickel steel.

In the following examples the time of reaction varies considerably, as might be supposed, depending on the nature of the raw material, the activity of the catalyst, temperature, pressure, and the like. In practice it is desirable to make a few preliminary runs in order to determine the time required for the best yields under a given set of conditions. Generally speaking, with batch operations, the total time may be from two to ten hours or more, depending on the yield desired, while with continuous operations the time is usually shorter. When continually feeding liquid or difficultly vaporizable oils, the rate of flow may be in the neighborhood of .3 to .8 volumes of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion; for example, the rate of flow of hydrogen may be in excess of about 600 liters per kilogram of carbonaceous material.

A suitable arangement of apparatus for carrying out the process is illustrated in the accompanying drawing. The process may be further described with reference thereto.

Finely ground brown coal is pasted in the mixing vessel 2 with oil from the tank 1 and the mixture is thereafter forced by means of pump 3 together with hydrogen which is supplied from conduit 20, through the preheater 5, into the reaction vessel 6. The regulation of the amount of hydrogen necessary for the conversion is effected by means of valve 4. The separation of the solid and fluid and gaseous and vaporous portions takes place in the separator 7. The fluid and solid portions are released through valve 8 and removed from the reaction system through conduit 9, whereas the gaseous and vaporous parts are further heated in a coil 11 and then conducted into the second vessel 12, which is filled with molybdic acid admixed with free sulphur. The distilled reaction products give off their heat in the heat exchanger 13 to the entering hydrogen and are thereby condensed. The obtained low boiling products are released from the stripper 14 through valve 15 and are conducted into a supply tank 17 by means of a conduit 16, whereas the hydrogen is conducted into the washer 18 and is there freed from the gaseous hydrocarbons with the assistance of oil. The oil is introduced into the upper part of the washer by means of conduit 25, sprayed through a nozzle 26 and again drawn off on the bottom. The oil is released through valve 27 into a receiver 28, from which the dissolved hydrocarbons escape through conduit 30. The oil is drawn off by means of pump 29, compressed and returned into the washer. The purified hydrogen leaves the washer through conduit 19 and is reintroduced into the system by the rotating pump 22 through conduit 20. Fresh hydrogen, compressed by means of compressor 21, may be introduced through conduit 24, the amount of such hydrogen being regulated by valve 23.

In case a catalyst is used in the first step, the addition is preferably made in the mixing vessel 2.

In case the conversion is to be made in the presence of water vapor, water is introduced by means of pumps 31 and 31a respectively, through conduit 32, into the reaction vessel 6, or through conduit 32a into the second reaction vessel 12. The regulation of the necessary amount of water is effected by means of valves 34 and 34a respectively. The water evaporates in the coils 5 and 11, is condensed behind the reaction oven in the heat exchanger 13 and collected at the bottom of tank 17. From there it may be drawn off through conduit 36, whereas the benzine is removed through an opening 37 positioned at a higher level in the tank.

The following examples will serve to further explain how our invention is carried out in practice, but we do not restrict our invention to these examples.

*Example 1*

Jura shale oil of 0.950 sp. gr. containing 4 per cent of sulphur which on distilling yields 6 per cent petrol up to 150° C. and 21 per cent of a pitch-like residue over 350° C. is incorporated with an excess of a gas mixture composed of three parts by volume of hydrogen and 1 part of nitrogen and continuously passed under a pressure of 200 atmospheres and at a temperature of from 450° to 500° C., over a catalyst prepared from an intimate mixture of 70 parts by weight of ammonium molybdate and 30 parts of aluminium hydroxide. The product is a mobile yellowish oil of 0.810 sp. gr. containing 80 per cent of a saturated petrol boiling up to 150° C. and leaving at 200° C. a slightly colored liquid residue.

Example 2

A middle oil obtained by cracking crude oil, having a boiling point range of between 200° and 325° C. and containing 0.1 per cent of sulphur is passed together with 1 per cent of sulphur in the form of ethyl sulphide at 420° C. and under a hydrogen pressure of 200 atmospheres over a catalyst consisting of molybdenum trioxide, zinc oxide and magnesia. By one through-put 66 per cent of benzine are obtained, whereas when dispensing with the addition of sulphur only 52 per cent of benzine are formed. Furthermore the working life of the catalyst is prolonged by the addition of sulphur.

Example 3

The middle oil referred to in Example 2 is treated under the same conditions as described in the said example, but instead of the addition of ethyl sulphide 1 per cent of elementary sulphur is directly dissolved in the oil after sufficient preheating of the latter. The results obtained are practically the same as those described in the said example.

Our invention is not confined to the above examples; the conditions may be widely varied in various directions. For example, the pressures and temperatures may be higher or lower than stated above.

In the appended claims, the expression "distillation and extraction products thereof" is intended to relate only to solid and liquid distillation and extraction products and is not to be construed to include normally gaseous products of the distillation of solid and liquid fuels. Likewise, wherever we specify oxides, we contemplate within the scope of this term compounds of the corresponding metals, which, under the conditions of working employed, will be decomposed to the oxides. By the term "heavy metal", wherever employed in the claims, we mean a metal having a specific gravity which is greater than 4.

What we claim is:—

1. The process of destructively hydrogenating carbonaceous materials such as solid and liquid fuels, distillation and extraction products thereof, which comprises treating them with hydrogen at a temperature between about 300° and 700° C. under a pressure of at least 20 atmospheres and in the presence of a catalyst containing combined sulphur generated in the reaction from a metal oxide immune to poisoning by sulphur and added free sulphur.

2. The process as defined in claim 1, wherein the pressure is at least 50 atmospheres and the metal oxide is an oxide of a metal of group 6 of the periodic system.

CARL KRAUCH.
MATHIAS PIER.